Aug. 6, 1929.   O. W. HEISE   1,723,548

SENSITIVE HIGH PRESSURE GAUGE

Filed Aug. 26, 1925

Inventor
Otto W. Heise,
by Roberts Roberts & Cushman
Attorneys.

Patented Aug. 6, 1929.

1,723,548

UNITED STATES PATENT OFFICE.

OTTO W. HEISE, OF BRIDGEPORT, CONNECTICUT, ASSIGNOR, BY MESNE ASSIGNMENTS, TO CONSOLIDATED ASHCROFT HANCOCK COMPANY, OF NEW YORK, N. Y., A CORPORATION OF DELAWARE.

SENSITIVE HIGH-PRESSURE GAUGE.

Application filed August 26, 1925. Serial No. 52,707.

This invention pertains to pressure gauges and more particularly to gauges for indicating high pressures. In modern engineering practice there are many situations in which high fluid pressures are met with and where it is desirable to indicate small fluctuations in pressure occurring within a given range which lies near the upper limit of such high pressure range. For example, in steam boiler practice where pressures of six hundred pounds or more are becoming common, it is usually unnecessary to observe small changes in pressure up to about five hundred pounds, although beyond this point and especially in the neighborhood of six hundred pounds it is quite important to be able to determine the pressure with considerable exactness.

Pressure gauges as usually constructed are not capable of meeting the above requirements; diaphragm gauges will not ordinarily stand up for any length of time when subjected to such high pressures, while a Bourdon tube gauge of usual construction, if made sensitive enough to give clearly distinguishable readings, is destroyed or at least stressed beyond its elastic limit by such high pressure.

From consideration of the above facts, I have been led to devise the present invention wherein I employ an ordinary spring, either of compression or tension type, to sustain the major part of the pressure load, such spring being hereinafter referred to as the pressure measuring spring. In accordance with the present invention this spring is not in direct contact with the fluid whose pressure is to be measured so that its temper is not affected by the high temperature of the pressure fluid. With this spring I associate a hollow thin-walled elastic body which tends to deform progressively when subjected to increasing fluid pressure and whose primary function may be compared to that of a cylinder and piston in that it converts the fluid pressure into mechanical motion for moving the index of the gauge in response to pressure variations. This hollow elastic body may, as more fully described in my copending application Serial No. 52,703, filed August 26, 1925, take the form of a Bourdon tube but, as herein disclosed, this elastic body is a metallic bellows consisting of a cup-like body having corrugated walls, such a device commonly being referred to as a "sylphon" and this term is hereinafter employed as conveniently descriptive of devices of this general character. Unlike a piston working in a cylinder, the sylphon requires no packing, is not subject to leakage if properly made, is substantially frictionless, and is easier and cheaper to construct.

While the primary function of the sylphon as used in my improved gauge herein disclosed is merely to transform static pressure of a fluid into mechanical movement, a second characteristic, which I have found useful particularly in the construction of high pressure gauges, is that it possesses inherent resiliency and resistance to expansion so that when the pressure rises to such a point as to balance the spring load, the resiliency of the sylphon acting in series with the spring becomes operative to measure further increments of pressure, although such increments may be of small amount as compared with the entire pressure range.

Although in this arrangement the sylphon may be exposed to high temperatures so that its accuracy may to some extent be affected, the degree of control which it exercises upon the index is so small as compared with that of the pressure measuring spring that minor irregularities in the movement of the sylphon may be substantially disregarded.

Although sylphons of any usual type may be employed for the purpose above described, I prefer to employ a sylphon of the kind which I have described more fully in my copending application, Serial No. 52,705 filed August 26, 1925, and which, stated briefly, has its outwardly projecting ribs normally in contact so that it is not collapsible to any substantial extent. Such a sylphon, being produced by subjecting a sylphon of usual type to internal pressure far beyond its elastic limit, is found to possess entirely new and unexpected characteristics among which may be mentioned its capability, when externally loaded, to sustain pressures substantially up to the actual rupture point of the metal without showing any tendency to depart from a regular and predetermined rate of expansion and without permanently deforming or bending out of proper alignment.

In this device, the spring is at all times under a strain, either of tension or compression according to the design of the apparatus. This strain is maintained by a stop holding the parts from going to a relaxed position, in combination with an adjusting means on the spring for causing a predetermined strain to adjust the range of readings which the gauge will give. The pressure which is being measured must first be sufficiently high to balance the strain of the spring before any appreciable movement of the gauge parts will be caused. Thereafter the pressure will be measured almost wholly by the sylphon as the change in the tension of the spring over the range of movement permitted in the operation of the gauge is made as small as possible by constructing the spring with a relatively large number of open turns.

In the accompanying drawings in which I have illustrated certain desirable embodiments of the invention, by way of example, Fig. 1 is a front elevation of a pressure gauge made in accordance with the present invention;

Figure 1:
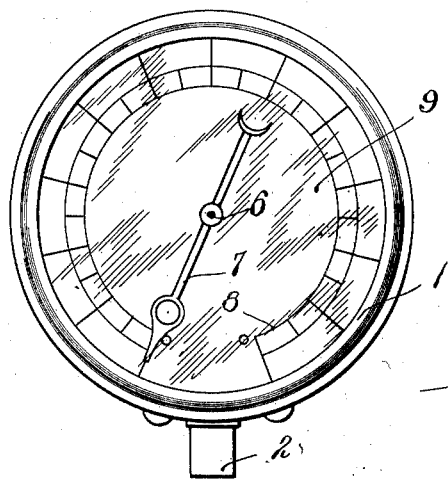

Referring to the drawings, the numeral 1 indicates a casing of usual type, having the neck or nipple 2 for attachment to a pressure conduit. The casing is provided with an internal bracket or base 3 to which may be connected the frame 4 which supports the gauge movement 5. The gauge movement comprises an index staff 6 carrying the movable index or needle 7 which cooperates with a scale 8 on the dial face 9.

The bracket 3 is provided with a socket 10 communicating by means of a passage 11 with the passage in the nipple 2. The socket 10 is adapted to support a sylphon 12. This sylphon is preferably of the type shown in Fig. 3, having a closed upper end 13 and a tubular neck 14 which fits within the socket 10 and has a fluid tight connection therewith. While under certain conditions a sylphon of ordinary type may be employed, I prefer to use a sylphon such as shown in my copending application above referred to and whose outwardly directed ribs 15 are normally substantially in contact so that the sylphon is substantially noncompressible.

Figure 2:
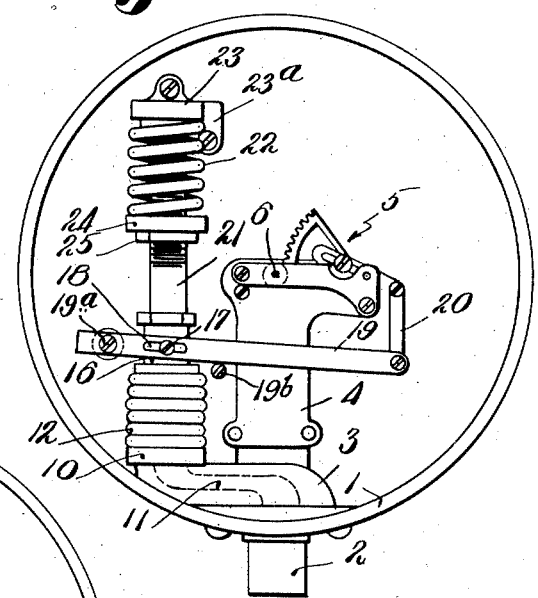
Fig. 2 is a front elevation, to somewhat larger scale, of the same gauge with the dial plate and index removed.

I provide a cap 16 which fits over or rests upon the upper end 13 of the sylphon and which carries a pin 17 passing through an elongate slot 18 in a lever 19 fulcrumed at 19ª upon a pin projecting from the rear wall of the casing. The free end of this lever 19 is connected to the gauge movement by a link 20. The initial position of the parts shown in Fig. 2 illustrates the lever 19 prevented from rotation in a clockwise direction about its pivot 19ª by a stop 19ᵇ which may take the form here shown of a stud fastened to the back or casing of the gauge.

The cap 16 supports the lower end of an adjusting bar 21 having a screw threaded portion which projects up into the interior of a coiled compression spring 22. The upper end of this spring is seated in a socket 23 carried by a bracket 23ª mounted on the rear wall of the casing. The lower end of the spring is seated in an annular cup 24 resting upon a nut 25 having threaded engagement with the bar 21. By turning the nut 25, the pressure which the spring 22 exerts upon the cap 16 may be adjusted to provide the necessary pressure and may be varied.

Figure 4:
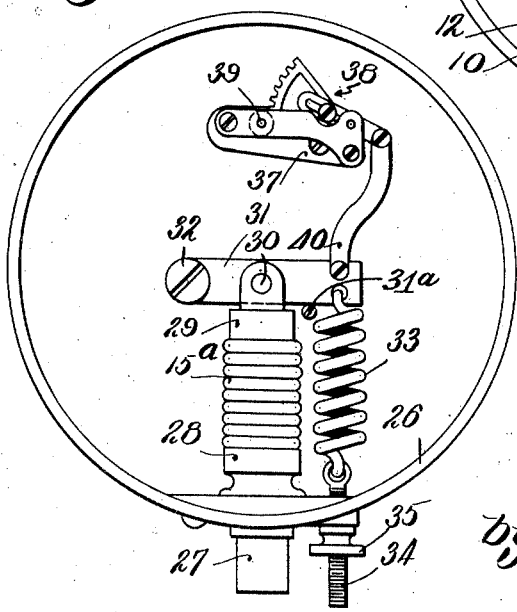
Fig. 4 is a view similar to Fig. 2, but showing a somewhat modified arrangement.

In Fig. 4 a modified arrangement is shown in which the casing 26, having the nipple 27, is provided with the internal bracket 28 forming a support for the sylphon 15ª which may be of the same type as that above described. A cap 29 rests upon the upper end of the sylphon and is connected by a pivot pin 30 to a lever 31 fulcrumed at one end upon a pin 32 projecting from the rear wall of the casing. The free end of the lever 31 is provided with an opening for the reception of the upper end of a coiled tension spring 33, whose lower end is secured to a screw threaded rod 34 extending freely through an opening in the lower part of the casing. This form of the device is provided with a stop 31ª similar in construction and function to the stop 19ᵇ described above. A nut 35 engages the outer end of the rod 34 and by rotating this nut the tension of the spring 33 may be adjusted to provide the necessary pressure and may be varied.

A bracket 37, in this case mounted upon the rear wall of the casing, supports a gauge movement 38 comprising an index staff 39. Movements of the lever 31 are communicated to the gauge movement by means of a connecting link 40.

Figure 3:
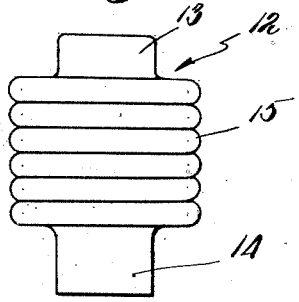
Fig. 3 is an elevation of a sylphon of a type particularly useful in the construction of gauges.

In the operation of the devices shown in Figs. 1 to 3 inclusive, the spring 22 is initially tensioned to load the sylphon so that the latter cannot appreciably respond to pressure below a predetermined degree. The spring 22 is ordinarily very stiff, as compared with the stiffness of the sylphon considered as a spring, so that the loading spring constitutes the principal means for measuring the pressure. When pressure is admitted to the interior of the sylphon, the gauge movement does not appreciably respond until the pressure has risen to a point sufficient to overcome the tension of the spring.

If the load becomes sufficient to balance the tension of the spring, the sylphon begins to expand and thus its elastic resistance is added to that of the spring. The relatively small resistance offered by the sylphon combined with the tension of the spring thus becomes effective to measure very small increments in pressure to which the spring alone would show but little response. With this arrangement it is possible to employ a pressure responsive element sensitive enough to show variations in pressure of the order of one-half pound or less but to employ the apparatus for indicating pressures covering a high range, for example, pressures lying between four hundred and five hundred pounds.

In this arrangement it is thus evident that the sylphon functions very largely as does a piston working in a cylinder, in that it transforms the potential energy of the fluid into kinetic energy of movement, but without danger of leakage and without necessitating the employment of packing or other devices which offer substantially frictional resistance of indeterminate amount and thus reduce the accuracy of operation of the gauge.

The arrangement shown in Fig. 4 operates substantially in the same way as that just described, with the exception that a tension spring is employed instead of a compression spring. This arrangement may be preferred in some instances, particularly where the pressures to be measured are not excessively high. The form of stop here shown is only illustrative of a method of providing a load on the device. This method could also be carried out, for example by providing apertured studs within the sylphon which would contact with each other during the time when the device is not measuring any pressure. When the pressure being measured rises to the point where it balances the loading pressure, the device operates in the obvious way and the pressure is measured in the manner described above.

While I have made reference to the utility of this arrangement in measuring high pressures, it is clear that gauges may be constructed in accordance with this principle to measure substantially any pressure, and while I have shown a specific arrangement of parts, I wish it to be understood that the invention is not to be limited to the specific construction here shown, but that the principle of operation may be embodied in gauges of other types and that equivalent elements may be substituted for those here shown without departing from the spirit of the invention.

I claim:

1. Apparatus for indicating small fluctuations in pressure occurring within a predetermined range which lies near the upper limit of a high pressure range, said apparatus comprising a movable index, and means for determining the position of the index comprising, a sylphon exposed to internal pressure, a pressure measuring spring opposing the movement of the sylphon in response to such internal pressure, and means initially stressing the spring, the spring exerting such force in opposition to the sylphon as to prevent movement of the index until the pressure has reached the lower limit of such predetermined range.

2. Apparatus for indicating small fluctuations in pressure occurring within a predetermined range which lies near the upper limit of a high pressure range, said apparatus comprising a movable index, an expansible sylphon exposed to internal pressure, means connecting the index and sylphon whereby the expansion of the sylphon moves said index, a pressure measuring spring opposing movement of the index, and means initially loading the spring so as to prevent any substantial movement of the index by the sylphon until the pressure has reached the lower limit of said predetermined range.

3. Apparatus for indicating small fluctuations in pressure occurring within a predetermined range which lies near the upper limit of a high pressure range, said apparatus comprising a movable index coperating with a relatively fixed scale to indicate pressure, a sylphon, a movable member connected to the sylphon, a pressure measuring spring opposing movement of said movable member by the sylphon, means initially loading the spring, means limiting movement of said movable member by action of the spring, and means for transmitting movement from said movable member to the index.

4. Apparatus for indicating small fluctuations in pressure occurring within a predetermined range which lies near the upper limit of a high pressure range, said apparatus comprising an index, a pressure measuring spring, means for transmitting movement from the spring to the index, means for converting static pressure into force tending to stress the spring, said latter means comprising a cylindrical hollow thin walled elastic body axially expansible when exposed to internal pressure the expansion thereof being opposed by the spring, the spring being of such strength and having means so initially loading it as substantially to prevent expansion of said elastic body until the pressure has reached the lower limit of said predetermined range.

5. Apparatus for indicating small fluctuations in pressure occurring within a predetermined range which lies near the upper limit of a high pressure range, said apparatus comprising a sylphon exposed to internal fluid pressure, a movable part connected to the sylphon and means imposing a predetermined initial resilient load thereon, said load being large as compared with the force necessary to expand the unloaded sylphon so as to prevent response of the sylphon to pressure below the lower limit of said predetermined range.

6. Apparatus for indicating small fluctuations in pressure occurring within a predetermined range which lies near the upper limit of a high pressure range, said apparatus comprising a sylphon normally responsive to charges in pressure of the order of one pound per square inch, means so loading said sylphon as to prevent its response to pressures below three hundred pounds per square inch, and an index actuable by the sylphon.

7. Apparatus for indicating small fluctuations in pressure occurring within a predetermined range which lies near the upper limit of a high pressure range, said apparatus comprising a sylphon normally sensitively responsive to variations in pressure extending over a predetermined range, said sylphon responding to changes of the order of one tenth of one percent of the upper limit of said pressure range, and means comprising a spring so initially loading the sylphon as substantially to prevent response of the sylphon to pressure variations occurring below the middle of said range.

8. Apparatus for indicating small fluctuations in pressure occurring within a predetermined range which lies near the upper limit of a high pressure range comprising a movable index, a lever, means for transmitting movement of the lever to the index, a pressure measuring spring opposing movement of the lever, a stop to limit movement of the lever by the spring, and a sylphon exposed to the pressure to be measured and adapted to convert pressure change into mechanical motion for swinging the lever.

9. Apparatus for indicating small fluctuations in pressure occurring within a predetermined range which lies near the upper limit of a high pressure range, said apparatus comprising a movable index, a non-collapsible sylphon, means for transmitting movements of expansion of the sylphon to the index and means for loading the sylphon.

10. Apparatus for indicating small fluctuations in pressure occurring within a predetermined range which lies near the upper limit of a high pressure range, said apparatus comprising a graduated dial, an index cooperable therewith, a non-collapsible sylphon, means for transmitting movements of the sylphon to the index, and means for loading the sylphon externally.

11. Apparatus for indicating small fluctuations in pressure occurring within a predetermined range which lies near the upper limit of a high pressure range comprising a movable index, a sylphon, a lever connected to the sylphon, a pressure measuring spring opposing movement of the lever, a stop limiting movement of the lever in response to the spring, adjustable means for applying initial stress to the spring sufficient to prevent response of the sylphon to pressure below the lower limit of said predetermined range, and means for transmitting movement from the lever to the index.

12. Apparatus for indicating small fluctuations in pressure occurring within a predetermined range which lies near the upper limit of a high pressure range comprising a graduated dial, an index movable relatively thereto to indicate pressures, a sylphon exposed at its interior to the pressure to be measured, means for transmitting expansion movement of the sylphon to the index, a stop for limiting motion of said movement transmitting means as the sylphon collapses, and a pressure measuring spring applying an external load upon the sylphon and thereby substantially preventing its response to pressures below the limit of said predetermined range.

13. Apparatus for indicating small fluctuations in pressure occurring within a predetermined range which lies near the upper limit of a high pressure range comprising a movable index, a non-collapsible sylphon for moving the index, the sylphon being sensitively responsive to slight pressure variations but capable of sustaining high pressures without deformation beyond the elastic limit when externally loaded, and means externally loading the sylphon.

14. Apparatus for indicating small fluctuations in pressure occurring within a predetermined range which lies near the upper limit of a high pressure range, said apparatus comprising a graduated dial, an index cooperable therewith, a lever, means connecting the lever to the index, a sylphon for moving the lever in one direction, the sylphon being exposed to internal pressure and normally having the outer surfaces of its outwardly directed folds in substantial contact near their outer edges, a spring opposing movement of the lever by the sylphon, and means so initially stressing the spring as substantially to prevent movement of the lever by the sylphon until the pressure has reached the lower limit of said predetermined range.

15. Apparatus of the class described comprising a device sensitively responsive to minute progressive change in a physical characteristic of a material substance, and means for applying an external load to said device to delay its response to increment of change until a definite predetermined point in the range of progressive change has been attained, the load being substantially uniform at all times.

16. Apparatus for indicating small fluctuations in pressure occurring within a predetermined range which lies near the upper limit of a high pressure range, comprising a device sensitively responsive to small changes in fluid pressure and normally moving in a given direction during progressive change in pressure, and means substantially preventing such movement of said device until a definite predetermined pressure has been obtained.

17. Apparatus for indicating small fluctuations in pressure occurring within a predetermined range which lies near the upper limit of a high pressure range, comprising a device which tends progressively to move in a given direction in response to increments in fluid pressure, and means imposing a substantially unvarying load upon said device which substantially prevents such response until a predetermined summation of said increments has been obtained.

18. Apparatus for indicating small fluctuations in pressure occurring within a predetermined range which lies near the upper limit of a high pressure range, comprising a hollow thin-walled elastic body which tends progressively to deform when subjected to an increasing internal fluid pressure, and an external load normally opposing a substantially constant force tending to prevent deformation of said body.

19. Apparatus for indicating small fluctuations in pressure occurring within a predetermined range which lies near the upper limit of a high pressure range, comprising a hollow thin-walled elastic body which tends to deform progressively when subjected to increasing fluid pressure, means loading said body so that it is not permitted substantially to deform until the fluid pressure increases to a predetermined point, the load being substantially the same at all pressures, and an indicator actuable by said elastic body when the latter is deformed by pressure fluid at a pressure above said predetermined point.

20. Apparatus for indicating small fluctuations in pressure occurring within a predetermined range which lies near the upper limit of a high pressure range, comprising a device sensitively responsive to changes in fluid pressure and tending to move in a given direction from its normal position when subjected to progressively increasing pressure, means constantly imposing a load upon said device which opposes said movement of the tube by pressure, and a stop to determine the normal position of the pressure responsive device.

Signed by me at Bridgeport, Connecticut, this 24th day of August, 1925.

OTTO W. HEISE.